United States Patent [19]

Okumura et al.

[11] Patent Number: 5,008,065
[45] Date of Patent: Apr. 16, 1991

[54] REACTION INJECTION MOLDING METHOD

[75] Inventors: Kin-ichi Okumura, Kamakura; Koji Chono, Kurashiki; Hiroshi Ozeki, Kurashiki; Tadao Hamada, Kurashiki, all of Japan

[73] Assignee: Nippon Zeon Co., Ltd., Tokyo, Japan

[21] Appl. No.: 380,424

[22] Filed: Jul. 17, 1989

[30] Foreign Application Priority Data

Jul. 19, 1988 [JP] Japan ................. 63-178260

[51] Int. Cl.$^5$ .............................. B28B 7/38
[52] U.S. Cl. .................. 264/328.6; 264/328.2; 264/331.17; 264/338
[58] Field of Search ............ 264/328.6, 328.2, 338, 264/331.17

[56] References Cited

U.S. PATENT DOCUMENTS

| 4,400,340 | 8/1983 | Klosiewicz | 264/328.6 |
| 4,418,179 | 11/1983 | DeWitt et al. | 525/249 |
| 4,520,181 | 5/1985 | Klosiewicz | 264/328.6 |
| 4,598,102 | 7/1986 | Leach | 264/328.6 |
| 4,600,763 | 7/1986 | Goel | 528/111 |
| 4,708,969 | 11/1987 | Leach | 264/328.6 |

Primary Examiner—Robert A. Dawson
Assistant Examiner—Allan R. Kuhns
Attorney, Agent, or Firm—George A. Kap; Thoburn T. Dunlap

[57] ABSTRACT

An organic fluorine compound as a mold release agent wherein at least one norbornene compound is polymerized by ring opening in a mold coated with said release agent. The organic fluorine compound release agent can be used in combination with a conventional mold release agent.

19 Claims, No Drawings

REACTION INJECTION MOLDING METHOD

BACKGROUND OF THE INVENTION

A method for the manufacture of molded products by the reaction injection molding (RIM) method using norbornene monomers, such as dicyclopentadiene (DCPD) and methyl tetracyclododecene, as molding materials has drawn attention in recent years to a wide range of fields such as automotive, electrical, electronic, civil engineering, house furnishings and leisure products. These molded products are often coated or painted in order to improve their appearance. Furthermore, it has been required to obtain many moldings in an as short a period of time as possible, from the viewpoint of productivity during manufacturing.

However, if a norbornene monomer or a mixture thereof is allowed to react inside a forming mold, a problem frequently occurs in which the molded product cannot be easily released or extracted from the mold. Therefore, a variety of mold-releasing agents have been used. However, for the RIM method using norbornene monomers, suitable mold-releasing agents have not been discovered to date.

Known mold-release agents for molds include silicone, mineral oils, wax, fatty acid derivatives, glycol, and other natural or synthetic compounds as such or diluted with solvents, talc, silica, alumina, mica, or other inorganic substances dispersed in solvents, or used in combination with wax in a paste form. In general, these mold-release agents are coated prior to the introduction of the molding materials into the molds.

In the urethane RIM method, natural or synthetic waxes are commonly used as mold-release agents because of their low cost. Examples of such mold-release agents include esters of fatty acids and monovalent or polyvalent alcohols, wood wax and other plant waxes, beeswax, lanolin and other animal waxes, paraffin, microcrystalline and other petroleum waxes, montan wax and other coal waxes, polyolefins, hydrocarbon oligomers and other synthetic waxes.

However, if these mold-release agents are used in the RIM method utilizing norbornene monomers as the molding materials, the polymerization reactivity of the monomers is hindered and it is difficult to obtain excellent molded products having smooth and lustrous surfaces. Moreover, since the norbornene monomers have an effect as an organic solvent, they may dissolve the mold-release agents in some cases. As a result, there is a problem of reducing mold-release effectiveness.

Silicone is the most commonly used mold-release agent because of its good mold-release characteristics. However, if the norbornene monomers are used as molding materials, the surface will become white when the molded products with good mold-release characteristics are released from the molds. This is known as the whitening phenomenon. Therefore, there is a problem of decreasing the commodity value of the molded products. Furthermore, silicone oils move readily or permeate into the molded products. Coating or adhesion processing of surfaces of such molded products is difficult. Since the molded products obtained by the RIM method often require coating, an improvement in their coatability is a technologically important topic.

If an inorganic substance, such as talc or silica, is used in combination with wax, glycol, or the like as a mold-release agent, it will be necessary to use a relatively large amount of the mold release agent. If molding is continued under these conditions, the residue of the mold-release agent or the molded product will remain in the corners of the mold. As a result, the mold must be cleaned often and the molding operation efficiency will decrease.

It is known that compounds containing fluorine have a low surface energy. In the urethane RIM method, the fluorine-containing compound is utilized in combination with the previously described wax or silicone oil, talc, silica, or the like as the mold-release agent. These combination mold-release agents have the problem described previously when the norbornene monomers are used as the molding materials. Furthermore, if the fluorine compounds are used alone, it is said that their mold-release effectiveness will decrease.

In the case of molds for creating a delustered or cloudy condition in the molded product, without surface tackiness, there are many microfine concave-convex portions on the surface of the molds. As a result, the conventional mold-release agents collect readily in the concave portions and uniform coating is difficult. In addition, in the case of the mold-release agents without lasting mold-release effectiveness, it will be necessary to coat the mold-release agents repeatedly for each of the various molding cycles. Such operation has been one of the causes of the reduction of productivity.

In the method for the manufacture of the molded products by the RIM method using the norbornene monomers as the molding materials in this manner, it is required to have mold-release agents which have good operability, increased molding cycles, no occurrence of poor molding or whitening of the surfaces of the molded products, and no adverse effects on secondary processing, such as coating and adhesion.

SUMMARY OF INVENTION

The present invention relates to a method for the reaction injection molding (RIM) of a norbornene monomer. More specifically, it relates to a reaction injection molding method capable of producing a molded product with good molding operation and excellent surface characteristics by using a mold coated with an organic fluorine compound having good mold-releasing characteristics.

DETAILED DESCRIPTION OF INVENTION

The objective of the present invention is to provide a molding method for obtaining molded products having good operability, increased molding cycles, excellent surface luster and smoothness, and no adverse effects on secondary processing such as coating and adhesion.

As a result of investigations to solve the previously described drawbacks of the conventional mold-release agents, a mold-release agent was found which contains an organic fluorine compound as an effective component. Such a mold-release agent is coated on the forming mold in the reaction injection molding method wherein a molding material containing at least one norbornene monomer as the major component is poured into the mold. In doing this, the present inventors have found that molded products with good molding characteristics and excellent surface characteristics can be obtained.

The gist of the present invention is a reaction injection molding method characterized by the fact that a mold coated with an organic fluorine compound mold-release agent is used in carrying out the method wherein a norbornene monomer and a metathesis catalyst are introduced into the mold.

The organic fluorine compound mold-release agents which can be used in the present invention are those which are liquids or solids at the molding temperature. For example, fluorine-containing organic compounds suitable herein include fluorinated ethers, addition polymers of fluorinated olefins, fluorinated organic acid compounds, salts of perfluorosulfonic acids, and the like.

Specific examples of fluorinated ethers include methyl polyoxyethylene perfluorononyl ether, methyl polyoxypropylene perfluorononyl ether, methyl polyoxyethylene perfluorooctyl ether, methyl polyoxyethylene perfluorostearyl ether, ethyl polyoxyethylene perfluorononyl ether, and other perfluoroalkyl ethers; and ring-scission polymers of 3-perfluouropentyl-1,2-epoxy propane, ring-scission copolymers of 3-perfluoropentyl-1,2-epoxy propane and ethylene oxide, epichlorohydrin, or the like, and other ring-scission polymers of fluoro epoxide with resinous or oily structures.

Specific examples of addition polymers of fluorinated olefins include polyhexafluoropropane, polytetrafluoroethylene, polytrifluorochloroethylene, polyfluorovinylidene, and others are available. These may be oily or resin-forming polymers.

Specific examples of fluorinated organic acid compounds include sodium salts, potassium salts, and the like of perfluoroacetic acid, perfluoroethylacetic acid, and other salts of perfluorocarboxylic acids; methyl esters, ethyl esters, propyl esters, butyl esters, and other alkyl esters of perfluorocarboxylic acids; polymers of perfluoroalkyl acrylate or methacrylate, and copolymers of these monomers with butyl acrylate, butyl methacrylate, stearyl acrylate, stearyl methacrylate; salt of perfluorosulfonic acid and the like.

Among these, especially fluorinated ethers give excellent performance. These organic fluorine compound mold-release agents may be used alone or in combinations of two or more of them.

Furthermore, mold-release agents other than the organic fluorine compound mold-release agents may also be used in combination in order to increase the mold-release characteristics as long as the polymerization of the norbornene monomers is not hindered. Amounts of addition have no special restrictions. However, from the viewpoint that the performance of the organic fluorine compound mold-release agents is not reduced, less than 50 weight percent, especially less than 30 weight percent are suitable with respect to the other mold-release agents, based on the weight of the active ingredients of the mold-release agent.

The organic fluorine compound mold-release agents which can be used in the present invention are generally utilized in solution or dispersion in organic solvents or aqueous media.

Examples of organic solvents include methanol, ethanol, propanol, isopropanol, and other alcohols; acetone, methyl ethyl ketone, methyl isobutyl ketone, and other ketones; ethyl ether, isopropyl ether, dioxane, tetrahydrofuran, and other ethers; ethyl acetate, butyl acetate, and other esters; hexane, cyclohexane, toluene, xylene, and other hydrocarbons; carbon tetrachloride, methylene chloride, trichloroethylene, perchloroethylene, trichloroethane, trichlorofluoromethane, tetrachlorodifluoroethane, trichlorotrifluoroethane, and other halogenated hydrocarbons. These may be used alone or in combination with each other or with water.

From the viewpoint of the hazard of fire accidents due to the organic solvents, the minimization of the toxicity on human bodies, or other operating environments, the use of water, a mixed solvent of water and an alcohol, or a medium obtained by the dispersion of an organic solvent in water or the like, is preferred.

In the dispersion of fluorine compound mold-release agents in aqueous media, it is acceptable to carry out emulsification by using a small amount of a cationic, anionic, or nonionic surfactant. If the surfactants are used in large quantities, problems like reduction in the mold-release characteristics, poor curing of molding materials, and color change, may occur. Therefore, it is preferable that the surfactant be used in a small quantity. The amount of surfactants used is ordinarily less than 1.0 part by weight, preferably 0.05 to 1.0, and more preferably less than 0.5 part by weight, based on 100 parts by weight of water.

The concentrations of the organic fluorine compound mold-release agents in the organic solvent solutions or aqueous dispersion solutions are preferably in the range of 0.05 to 10 weight percent in general. The concentrations of the mold-release agents can be adjusted properly according to the objectives of usage. For example, for a one time use of the mold, less than 0.1 weight percent will be sufficient. On the other hand, if molding is to be carried out several times by coating a molding-release solution or dispersion once, it will be proper to have 0.5–5 weight percent or higher.

In applying the organic fluorine compound mold-releasing agents to the molds, known methods can be used. For example, there is a method in which a mold is immersed in a solution or a dispersion of a mold-release agent, a method in which a mold is coated by spraying or brushing a solution or a dispersion of a mold-release solution, or by coating with a piece of soaked cloth followed by the removal of the organic solvent or water by evaporation, and so on. It is necessary that the organic solvent or water be removed completely prior to molding. Otherwise, there will be a possibility that the polymerization reaction of the norbornene monomers may be hindered. It is preferable that the mold be cleaned thoroughly with an organic solvent, wax, or the like prior to the application of the mold-release agent.

There are no special restrictions on the temperature of the molds during the application of the mold-release agents. In general, the molds are at room temperature of 25° C. to 120° C., preferably 30°–90° C. It is convenient to the operation to maintain the temperature of the mold at the molding temperature.

The materials of the molds which can be used in the RIM method of the present invention are not restricted to metals. In addition to metals, any of the resins, wood, cement, and the like can also be used. From the viewpoint of economy, resin molds, electroformed molds or the like are popular.

The shapes of the mold may range from a simplistic structure to a complicated one. For example, if a mold-release agent of the present invention is coated on ribs, bosses or other portions from which mold releasing is normally difficult, de-molding can be carried out readily with ease.

The monomers which can be used as the molding materials in the present invention are those which have at least one norbornene ring. However, in order to obtain polymers with high thermal deformation temperatures, it is preferable to use polycyclic norbornene monomers having more than three rings.

In the present invention, it is preferable that the polymers formed are of the thermosetting type. Therefore, it is preferable to use crosslinking monomers.

Examples of norbornene monomers include 2-norbornene, 5-methyl-2-norbornene, 5-ethyl-2-norbornene, 5-butyl-2-norbornene, 5-hexyl-2-norbornene, 5-ethylidene-2-norbornene, 5-phenylnorbornene and other bicyclic compounds; dicyclopentadiene, dihydrodicyclopentadiene and other tricyclic compounds; tetracyclododecene, methyl tetracyclododecene, ethyl tetracyclododecene, dimethyl tetracyclododecene, ethylidene tetracyclododecene, phenyl tetracyclododecene and other tetracyclic compounds; tricyclopentadiene and other pentacyclic compounds; hexacyclic norbornene compounds; tetracyclopentadiene and other heptacyclic compounds; and the like. More than one of these monomers may also be used in combination.

Among these, tricyclic compounds, tetracyclic compounds and pentacyclic compounds are preferred from the viewpoint of easy availability, reactivity, heat resistance, etc.

On the other hand, the crosslinking monomers are polycyclic norbornene monomers having two or more reactive double bonds. Specific examples thereof include dicyclopentadiene, tetracyclopentadiene, trimers and tetramers of cyclopentadiene, and the like. Therefore, if the norbornene monomer and the crosslinking monomer are the same substance, it will be unnecessary to use another monomer if a crosslinked polymer is desired.

These norbornene monomers may be used alone or in a mixture thereof.

The norbornene monomers having more than three rings can also be obtained by the heat treatment of a dicyclopentadiene. As the conditions for heat treatment, a dicyclopentadiene may be heated in an inert gas atmosphere at a temperature of 120°-250° C. for 0.5-20 hours. By such a heat treatment, a monomer mixture containing tricyclopentadiene and the unreacted dicyclopentadiene can be obtained.

Cyclobutene, cyclopentene, cyclopentadiene, cyclooctene, cyclododecene and other monocyclic cycloolefins which can be polymerized by ring opening polymerization can be used in combination with one or more previously mentioned norbornene monomers in a range which does not destroy the objectives of the present invention, preferably up to 20%, more preferably 1-10% by weight, based on the weight of the entire monomer charge.

The metathesis catalyst system described herein includes a catalyst and an activator or a cocatalyst. The catalysts which can be used in the present invention may be any of the methathesis catalysts known as the catalysts for the ring opening polymerization of norbornene monomers. For examples of such catalysts, see Japanese Kokai Patents Nos. Sho 58-127728, Sho 58-129013, Sho 59-51911, Sho 60-79035, Sho 60-186511, and Sho 61-126115. Such catalysts include organoammonium molybdates and tungstates which are insensitive to oxygen and moisture. Specific examples of the metathesis catalysts include halides, oxyhalides, oxides, organic ammonium salts, or the like of tungsten, molybdenum, and tantalum. Furthermore, specific examples of activators or cocatalysts include alkyl aluminum halides, alkoxy alkyl aluminum halides, aryloxy alkyl aluminum halides, and organic tin compounds.

In the case of the alkyl aluminum halide, there is a problem because polymerization initiates immediately if solutions containing a catalyst are mixed therewith. In such a case, by using modifying agents such as ethers, esters, ketones, nitriles, and alcohols, in combination with the activators, the initiation of the polymerization can be delayed. For examples of such systems, see Japanese Kokai Patents Nos. Sho 58-129013 and Sho 61-120814. If glass fibers or other fillers are used, such mixtures with a long pot life are beneficial to the achievement of uniform soaking into the fillers. From this viewpoint, a pot life of more than 5 minutes, preferably more than 10 minutes, and more preferably ½-8 hours at 30° C. is preferred.

Furthermore, in addition to the catalysts and the activators, it is also acceptable to use chloroform, carbon tetrachloride, hexachlorocyclopentadiene, and other halogenated hydrocarbons, as illustrated in Japanese Kokai Patent No. Sho 60-79035, as well as silicon tetrachloride, germanium tetrachloride, lead tetrachloride, and other metal halides.

The metathesis catalysts are generally used in the range of 0.01-50 mmol, preferably 0.1-10 mmol, per mol of the monomers. The metathesis activators or cocatalysts are generally used in the molar range of 0.1-200 moles, preferably 2-10 moles per mole of the catalyst compound.

Although it is preferable to use any of the metathesis catalysts and the activators in a monomer solution, they can also be used in suspension or in solution in a small amount of a solvent as long as the properties of the products are essentially not damaged.

In the present invention, it is possible to use a method in which the norbornene monomers are subjected to ring-opening polymerization in a bulk form by a metathesis catalyst. It is acceptable to use a small amount of a solvent as long as it is essentially bulk polymerization.

In the preferred ring-opening method, the norbornene monomers are divided into two liquids and placed in separate containers. A metathesis catalyst is added to one of them, and an activator is added to the other. In this fashion, two stable reaction solutions are prepared and stored. These two solutions are mixed and then poured into a mold of a desired shape. Here, ring-opening polymerization in bulk is carried out.

In the present invention, impingement mixing apparatus known conventionally as the RIM molding apparatus can be used to mix the two reaction solutions. In this case, the containers containing the two reaction solutions will be the supply sources of the separate streams. The two streams are mixed instantaneously in the mixing head of the RIM machine and then the mixed streams are poured into a heated mold where bulk polymerization is allowed to proceed immediately to yield a thermoset, molded product.

Although impingement mixing apparatus can be used in this manner, the present invention will not be restricted to such a mixing means. After the completion of the mixing of the two reaction solutions in the mixer, if the pot life at room temperature is longer than one hour, it may be injected or poured in several intervals or increments into a preheated mold, as described in Japanese Kokai Patent No. Sho 59-51911 and U.S. Pat. No. 4,426,502. Furthermore, the mixed streams may also be poured continuously into the mold.

In this method, the apparatus can be miniaturized in comparison with the impingement mixing apparatus. Furthermore, it has an advantage of operating at a low pressure. If the amount of glass fibers or other fillers is large, the reaction solutions can be injected uniformly into the mold by reducing the pouring speed.

Furthermore, the present invention is not restricted to a method using two reaction solutions. As is readily understood by people in the industry, a variety of modifications is possible. For example, a third stream obtained by placing a monomer and a desired additive into a third container may be used.

The mold temperature is generally more than 30° C., preferably 40°-200° C., even more preferably 50°-120° C. The mold pressure is generally in the range from 0.1 to 100 kg/cm$^2$.

The polymerization time can be selected properly. Ordinarily, it is shorter than about 20 minutes, preferably less than 5 minutes. However, it may also be longer than this.

The reaction solutions are generally stored or used under nitrogen gas or other inert gas atmosphere. However, it is also acceptable that the mold is not necessarily sealed with an inert gas.

By blending with antioxidants, fillers, pigments, coloring agents, foaming agents, flame retardants, plasticizers, elastomers, hydrogenated polydicyclopentadiene resin, and a variety of other additives, the characteristics of the polymers obtained can be improved.

As the antioxidants, there are antioxidants of the phenol type, phosphorus type, amine type, or the like for polymers described herein.

As the fillers, there are milled glass, glass long fibers, glass mat, carbon black, talc, calcium carbonate, mica, and other inorganic fillers.

As the elastomers, there are natural rubber, polybutadiene, polyisoprene, styrene-butadiene copolymer, styrene-butadiene-styrene block copolymer, styrene-isoprene-styrene block copolymer, ethylene-propylene-diene terpolymer, ethylene-vinyl acetate copolymer, and hydrogenated products thereof.

The additives may be premixed with any or both of the reaction solutions. Alternatively, they may be placed in the cavity of a mold beforehand.

The present invention is illustrated in detail by the following examples. It goes without saying that the present invention is not restricted to these examples. Unless otherwise mentioned, parts an percentages are on the weight basis.

EXAMPLE 1-17

Dicyclopentadiene (DCPD) was placed in two containers. In one of the containers, 0.5 part of diethyl aluminum chloride, 0.2 part of n-propanol, 0.3 part of silicon tetrachloride, 5 parts of styrene-isoprene-styrene rubber; 1 part of an antioxidant (Ethanox 702, a methylene bisphenol antioxidant) were added per 100 parts of DCPD and formed Solution A.

In the other one, 0.4 part of tri(tridecyl ammonium)-molybdate, 5 parts of styrene-isoprene-styrene rubber, and 1 part of an antioxidant (Ethanox 702) were added per 100 parts of DCPD to form Solution B.

Solution A and Solution B kept in separate containers at 35° C. were delivered with constant flow pumps into the mixing head so that the two solutions had a volumetric ratio of 1:1. After mixing, the mixture of the two solutions was poured into a desired mold.

The mold was made of aluminum and had a flat plate-shaped cavity of 500 mm×500 mm×3 mm. Before the molding feedstock was poured, the mold surface was sprayed with the various fluorine compound mold-release agents shown in Table I while the mold was open. The solvent was evaporated. For comparison, a case in which a commonly used mold-release agent was employed is also shown.

The mold temperature was 70° C. The mold was closed and the molding material was poured into it. After the curing reaction was carried out for 90 seconds, the mold was opened.

After the completion of molding, the flat plate-shaped molded product obtained was extracted from the mold. The mold-releasing characteristics at this time, the surface state of the molded product, and the coating characteristics were evaluated. The results are shown in Table I.

TABLE I

| Test No. | Mold-Release Agent | Mold-Release Characteristics*[1] | Mold-Surface State*[2] | Molded Product Surface State*[3] | Molded Product Coating Characteristics*[4] |
|---|---|---|---|---|---|
| Example 1 | Methyl polyoxyethylene perfluorononyl ether (1% alcohol solution) | 1. Good (o) | Clean surface (4) | No whitening (4) | 100/100 |
| Example 2 | 3-Perfluoropentyl-1,2-epoxy propane oligomer (0.5% Freon 113 solution) | 2. Good (o) | Clean surface (4) | No Whitening (4) | 100/100 |
| Example 3 | Trifluorochloroethylene oligomer, Daifloil made by Daikin Industries (1% Trichlen solution) | 3. Relatively easy | Clean surface (4) | No whitening (4) | 100/100 |
| Example 4 | Hexafluoropropene oligomer derivative, Neos FX-1 made by Neos (1% Trichlen solution) | 4. Relatively easy | Clean surface (4) | No whitening (4) | 100/100 |
| Example 5 | Perfluorokerosene (1% Trichlen solution) | 5. Relatively easy | Clean surface (4) | No whitening (4) | 100/100 |
| Example 6 | Perfluoro-n-butyric acid n-butyl ester (1% alcohol solution) | 6. Good (o) | Clean surface (4) | Slight whitening (3) | 100/100 |
| Example 7 | Solution of fine powdered fluororesin, Tefreleez made by Ordec Company | 7. Good (o) | Clean surface (4) | No whitening (4) | 100/100 |
| Example 8 | Fluorine mold-release agent, Daifree A-441 made by Daikin Industries (spray) | 8. Good (o) | Clean surface (4) | Slight whitening (3) | 90/100 |
| Comparative Example 9 | Dimethyl silicone, Toray Silicone SH 200 (1% toluene solution) | 9. Good (o) | Good (4) | Partial whitening (3) | 0/100 |
| Comparative Example 10 | Silicone resin, Shin-Etsu Silicone KS 707 (1% toluene solution) | 10. Good (o) | Good (4) | Partial whitening (3) | 0/100 |
| Comparative Example 11 | Stearic acid (1% toluene solution) | 11. Effort required (x) | Good (4) | No whitening (4) | — |

TABLE I-continued

| Test No. | Mold-Release Agent | Mold-Release Characteristics[*1] | Mold-Surface State[*2] | Molded Product Surface State[*3] | Molded Product Coating Characteristics[*4] |
|---|---|---|---|---|---|
| Comparative Example 12 | Sorbitan monostearate (1% alcohol solution) | 12. Relatively easy | Slightly dirty (2) | Noncuring (2) | — |
| Comparative Example 13 | Fatty acid ester wax, Hochst Wax E (Hochst Japan) (1% alcohol solution) | 13. Good (o) | Slightly dirty (2) | Noncuring (2) | — |
| Comparative Example 14 | Wax, Rimkei #652 (Chukyo Oils and Fats (1% aqueous solution) | 14. Good (o) | Very dirty (1) | Noncuring (2) | — |
| Comparative Example 15 | Polyethylene wax (5% xylene solution) | 15. Good (o) | Slightly dirty (2) | Whitening and noncuring (1) | — |
| Comparative Example 16 | Stearyl alcohol (1% alcohol solution) | 16. Relatively easy | Slightly dirty (2) | Noncuring (2) | — |
| Comparative Example 17 | Talc (5% alcohol dispersed solution) | 17. Effort required in mold releasing | Very dirty (1) | Noncuring (2) | — |

Methods for the Evaluation of Physical Properties
(Footnotes to Table I)

[*1] The mold-releasing characteristics of the molded products from the molds were evaluated in three categories. The symbol "o" represents that the mold-release characteristics were very good. The symbol "Δ" represents that mold release was relatively easy. The symbol "x" represents a case requiring effort in mold release.

[*2] The surface state of the mold after molding was observed and evaluated in four categories. Clean surface: 4, slightly dirty: 3, dirty: 2, very dirty: 1.

[*3] The whitening and curing states of the molded products were evaluated in four categories. No whitening and no noncuring: 4, partial whitening, no noncuring: 3, noncuring: 2, whitening and noncuring: 1.

[*4] The coating or peeling characteristics of the molded products were evaluated in accordance with the peel test as follows. The surface of the molded product in a flat plate shape was washed with 1,1,1-trichloroethane. After degreasing with gauze, a urethane coating material was sprayed so that its thickness was 30 um and then thoroughly dried. Next, cuts were made as on a board according to JISD 0202 on this coating film.
After adhering an adhesive tape on it, a board test for drastic spalling was carried out. The number of coated films remaining Y was represented in the form of Y/100. A larger Y value represents better coating characteristics.

EXAMPLE 18

A mold coated with the organic fluorine compound mold-release agent shown in Example 1 was used. After the first molding, the same reaction solutions as in Example 1 were used. Under the same conditions, molding was repeated 10 times without recoating with the mold-release agent. For all ten times, the mold-release characteristics of the molded products from the mold were good. Whitening of the molded product surface did not occur. The coating characteristics were 100/100 and good.

In a RIM method using a norbornene monomer or a mixture thereof, by using a mold coated with a fluorine compound mold-release agent, it is possible to obtain a molded product having good molding characteristics and excellent surface characteristics.

With the commonly used mold-release agents other than the fluorine compound mold-release agents, the mold-releasing characteristics were poor. Even if the mold-releasing characteristics are good, the surface of the norbornene molded products will whiten or polymerization hindrance will occur if conventional mold-release agents are used. Molded products with good surface characteristics cannot be obtained with conventional mold-release agents. From this fact, effectiveness of the present invention using the fluorine compound mold-release agents is remarkable.

What is claimed:

1. In a process for molding an article wherein a mold-release agent is applied to the surface of a mold and polymerizing in said mold by ring-opening polymerization at least one norbornene monomer containing at least one norbornene group in the presence of a metathesis catalyst system to form a molded product and extracting from said mold said molded product, the improvement which comprises applying to said mold surface a mold release agent selected from the group consisting of organic fluorine compounds and mixtures thereof wherein said mold release agent does not impart whitening to said molded product.

2. Process of claim 1 wherein said organic fluorine compounds are selected from the group consisting of fluorinated ethers, addition polymers of fluorinated olefins, fluorinated organic acid compounds, salts of perfluorosulfonic acids, and mi thereof.

3. Process of claim 1 wherein said organic fluorine compounds are selected from the group consisting of methyl polyoxyethylene perfluorononyl ether, methyl polyoxypropylene perfluorononyl ether, methyl polyoxyethylene perfluorooctyl ether, methyl polyoxyethylene perfluorostearyl ether, ethyl polyoxyethylene perfluorononyl ether, ring-scission polymers of 3-perfluoropentyl-1,2-epoxy propane, ring-scission copolymers of 3-perfluoropentyl-1,2-epoxy propane and ethylene oxide, epichlorohydrin, polyhexafluoropropene, polytetrafluoroethylene, polytrifluorochloroethylene, polyfluorovinylidene, sodium salts and potassium salts of perfluoroacetic acid and perfluoroethylacetic acid, methyl esters of perfluorocarboxylic acids, ethyl esters of perfluorocarboxylic acids, propyl esters of perfluorocarboxylic acids, butyl esters of perfluorocarboxylic acids, polymers of perfluoroalkyl acrylate or methacrylate, copolymers of perfluoroalkyl acrylate or methacrylate with butyl acrylate or butyl methacrylate or stearyl acrylate or stearyl methacrylate, and mixtures thereof.

4. Process of claim 1 wherein said organic fluorine compounds are selected from the group consisting of methyl polyoxyethylene perfluorononyl ether, 3-perfluoropentyl-1,2-epoxy propane oligomer, trifluorochloroethylene oligomer, hexafluoropropene oligomer derivative, perfluorokerosene, perfluoro-n-ethylacetic acid n-butyl ester, solution fine powdered fluororesin, and mixtures thereof.

5. Process of claim 4 wherein said mold-release agent is dissolved or dispersed in water or in an organic solvent in concentration of 0.05–10% by weight.

6. Process of claim 5 including the step of removing water or said organic solvent from said mold-release agent before polymerizing said monomer in said mold.

7. Process of claim 6 wherein said mold-release agent has very good mold-release characteristics, gives clean surface after said molded product is extracted from said mold, does not impart whitening to said molded product, and meets the peel test of 100/100.

8. Process of claim 7 wherein said mold-release agent is selected from the group consisting of said organic fluorine compounds and mixtures thereof.

9. Process of claim 7 wherein said monomer is selected from the group consisting of tricyclic, tetracyclic, pentacyclic, hexacyclic, and heptacyclic norbornene compounds, and mixtures thereof.

10. Process of claim 7 wherein said monomers is selected from the group consisting of tricyclic and pentacyclic norbornene compounds, and mixtures thereof.

11. Process of claim 7 wherein said monomer is selected from the group consisting of dicyclopentadiene, derivatives of dicyclopentadiene, heat treatment products of dicyclopentadiene, and mixtures thereof.

12. Process of claim 7 wherein said metathesis catalyst system contains a catalyst selected from the group consisting of organoammonium molybdates, organoammonium tungstates, and mixtures thereof.

13. Process of claim 12 wherein said metathesis catalyst system contains a cocatalyst selected from the group consisting of alkoxy alkyl aluminum halides, aryloxy alkyl aluminum halides, and mixtures thereof.

14. Process of claim 7 wherein said metathesis catalyst system contains a cocatalyst selected from the group consisting of alkoxy alkyl aluminum halides, aryloxy alkyl aluminum halides, and mixtures thereof.

15. Process of claim 7 wherein said molded product is thermoset.

16. Process of claim 7 for making a thermoset molded product wherein said metathesis catalyst system includes a catalyst and a cocatalyst, said process comprises combining a plurality of streams, one of which contains said catalyst, a second stream contains said cocatalyst, and at least one of said streams contains said monomer, to form a reaction mixture, and then injecting said reaction mixture into said mold before extracting said product from said mold.

17. Process of claim 16 wherein said monomer is selected from the group consisting of tricyclic, tetracyclic, pentacyclic, hexacyclic, and heptacyclic norbornene compounds, and mixtures thereof.

18. Process of claim 17 wherein said metathesis catalyst, system contains a cocatalyst selected from the group consisting of alkoxy alkyl aluminum halides, aryloxy alkyl aluminum halides, and mixtures thereof.

19. Process of claim 18 wherein said metathesis catalyst system contains a catalyst selected from the group consisting of organoammonium molybdates, organoammonium tungstates, and mixtures thereof.

* * * * *